United States Patent
Kong et al.

(10) Patent No.: US 8,648,154 B2
(45) Date of Patent: Feb. 11, 2014

(54) PHOSPHORUS-CONTAINING PHENOL NOVOLAC RESIN, HARDENER COMPRISING THE SAME AND EPOXY RESIN COMPOSITION

(75) Inventors: Ji Woong Kong, Incheon (KR); Sang Min Lee, Seoul (KR); Ick Kyung Sung, Incheon (KR)

(73) Assignee: Kolon Industries, Inc., Gwacheon-si (KR)

( * ) Notice: Subject to any disclaimer, the term of this patent is extended or adjusted under 35 U.S.C. 154(b) by 249 days.

(21) Appl. No.: 13/259,070

(22) PCT Filed: Mar. 30, 2010

(86) PCT No.: PCT/KR2010/001930
§ 371 (c)(1),
(2), (4) Date: Dec. 2, 2011

(87) PCT Pub. No.: WO2010/114279
PCT Pub. Date: Oct. 7, 2010

(65) Prior Publication Data
US 2012/0095170 A1    Apr. 19, 2012

(30) Foreign Application Priority Data
Mar. 31, 2009 (KR) .................. 10-2009-0027404

(51) Int. Cl.
| | | |
|---|---|---|
| C08G 8/04 | (2006.01) | |
| C08G 59/62 | (2006.01) | |
| C08L 61/08 | (2006.01) | |
| C08L 63/00 | (2006.01) | |
| C08L 63/04 | (2006.01) | |

(52) U.S. Cl.
USPC .......................... 525/481; 525/489; 525/153

(58) Field of Classification Search
None
See application file for complete search history.

(56) References Cited

U.S. PATENT DOCUMENTS

| | | | | |
|---|---|---|---|---|
| 6,617,029 | B2 * | 9/2003 | Hwang et al. | 428/413 |
| 6,720,077 | B2 * | 4/2004 | Hirai et al. | 428/416 |
| 2002/0032279 | A1 * | 3/2002 | Hwang et al. | 525/107 |
| 2004/0077821 | A1 * | 4/2004 | Hwang et al. | 528/89 |
| 2004/0077825 | A1 * | 4/2004 | Hwang et al. | 528/398 |

FOREIGN PATENT DOCUMENTS

| | | | |
|---|---|---|---|
| JP | 2001-354685 A | * | 12/2001 |
| JP | 2002-88139 A | * | 3/2002 |
| JP | 2002-241470 A | * | 8/2002 |
| JP | 2003-73448 A | * | 3/2003 |

OTHER PUBLICATIONS

Liu, "Flame-retardant epoxy resins from novel phosphorus-containing novolac," Polymer, vol. 42, 2001, pp. 3445-3454.*
Levchik et al., "Thermal decomposition, combustion and flame-retardancy of epoxy resins—a review of the recent literature," Polymer International, vol. 53, 2004, pp. 1901-1929.*

* cited by examiner

*Primary Examiner* — Robert Sellers
(74) *Attorney, Agent, or Firm* — Sughrue Mion, PLLC

(57) ABSTRACT

This invention relates to a novel phosphorus-containing phenol novolac resin, use of the phosphorus-containing phenol novolac resin as a halogen-free flame retardant epoxy hardener, and an epoxy resin composition having high phosphorus content because it includes the phosphorus-containing phenol novolac resin, thereby exhibiting superior flame retardancy and heat resistance.

17 Claims, No Drawings

US 8,648,154 B2

PHOSPHORUS-CONTAINING PHENOL NOVOLAC RESIN, HARDENER COMPRISING THE SAME AND EPOXY RESIN COMPOSITION

CROSS REFERENCE TO RELATED APPLICATIONS

This application is a National Stage of International Application No. PCT/KR2010/001930 filed on Mar. 30, 2010, which claims priority from Korean Patent Application No. 10-2009-0027404, filed on Mar. 31, 2009, the contents of all of which are incorporated herein by reference in their entirety.

TECHNICAL FIELD

The present invention relates to a phosphorus-containing phenol novolac resin, a hardener including the same and an epoxy resin composition. More particularly, the present invention relates to a novel phosphorus-containing phenol novolac resin, an epoxy resin hardener including the phosphorus-containing phenol novolac resin, and an epoxy resin composition including the phosphorus-containing phenol novolac resin as a hardener.

BACKGROUND ART

The electrical and electronics related industry, which is regarded as the core of modern industry, is drastically developing in related markets and technology, and has very high added value, and is thus essential for modern society. Also, the related material industry, which together with the development of such electrical and electronics related industry is also being considered important, is backing up the advancing electronics industry.

The reason why thermosetting resins which are expensive are used in the field of electrical and electronics industry is that they have superior thermal, mechanical and electrical properties by curing, compared to those of thermoplastic resins. In particular, epoxy resins are mainly used as matrix resins because of their excellent electrical and mechanical properties in the field of copper clad laminate sheets (CCLSs) for printed circuit boards.

Generally, in order to fabricate a printed circuit board suitable for use in electrical and electronic products, a copper clad laminate (CCL) is manufactured by impregnating glass fiber, kraft paper or nonwoven fabric with a thermosetting resin such as phenol or epoxy resin, drying the resin to a semi-cured state (B-stage) thus making a prepreg, and coating one or both sides of the prepreg with copper foil. Also, in the case where a copper clad laminate having three or more layers which is classified as a multilayer printed circuit board is manufactured, an inner layer having wiring is formed on a double-sided copper clad laminate, and an outer layer is formed thereon using a prepreg and copper foil. Recently, as the sizes of the pads of the printed circuit board are reduced and the circuit width is reduced for fine pitch, high circuit density and high integration, it is common for micro via holes to be formed between the inner and outer copper clad laminates. The formation of such via holes may include laser drilling or plasma processing. As such, when the inorganic component such as glass fiber is included in the copper clad laminate as the reinforcement thereof, processing is not easy. Hence, there are many cases in which the insulating layer is formed of only a resin component without the reinforcement, which is called resin coated copper. When the multilayer printed circuit board is fabricated using the resin coated copper in this way, the via holes may be easily formed using laser drilling and fine pitch circuitry which is more stable may be formed.

The printed circuit board having the copper clad laminate or the prepreg and the resin coated copper should be imparted with flame retardancy so as to prevent ignition upon firing. The standard for flame retardancy typically is specified as a UL rating, and a UL-94 V-0 rating is required. Thus, the resin composition used therefor should have flame retardancy.

On the other hand, the epoxy resin exhibits the properties of thermosetting resin as a result of reacting with various hardeners. The epoxy resin is generally a polymer having two or more oxirane groups as a chemical unit of the molecule.

The case where the epoxy resin is used alone seldom occurs, and the epoxy resin may be used in the form of a thermosetting material after reaction with a hardener. The typical curing system which is the most commercially available may include amine/epoxide reaction, amide/epoxide reaction, acid anhydride/epoxide reaction, phenol novolac/epoxide reaction or the like.

Among them, the phenol novolac/epoxide system, which has outstanding heat resistance, dimensional stability, chemical resistance, and superior electrical properties, is mainly employed in electrical and electronics application such as semiconductor packaging or printed circuit board fabrication. In particular, in the case of a copper clad laminate for a printed circuit board, the use of phenol novolac hardener is gradually increasing in order to increase heat resistance.

As mentioned above, a variety of electrical and electronic products including a copper clad laminate require flame retardancy. To this end, diverse flame retardant compounds are being used. For example, a halogenated epoxy resin, in particular, a tetrabromobisphenol-A (TBBA)-containing epoxy resin is mainly utilized in a copper clad laminate. Furthermore, an additive type halogen-free flame retardant such as red phosphorus may be used. However, because the additive type flame retardant may cause the problem of the properties of a copper clad laminate deteriorating, it is seldom used. The halogenated compound emits very harmful gas (HBr, HCl, etc.) upon burning, undesirably causing problems such as harmfulness to the human body and metal corrosion. Because the regulations regarding the use of halogenated compounds have intensified in the European Union and Japan, the use thereof is becoming more and more difficult. With the goal of solving such problems, the demand for phosphorus- and nitrogen-based flame retardant compounds having low toxicity is increasing.

In particular, 9,10-dihydro-9-oxa-10-phosphaphenanthrene-10-oxide (hereinafter, abbreviated to "DOPO"), which is a phosphorus-based compound, is very frequently used for a copper clad laminate. Though DOPO may be used as an additive type, it may be employed in producing a phosphorus-containing epoxy resin through a reaction with the epoxy resin. When this DOPO is used as the main material of an epoxy resin composition, flame retardant properties may be imparted. The reason why DOPO is mainly used is that it has a very high phosphorus content on the order of 14.5% and has a structure in which one direction is open, thus easily exhibiting flame retardant properties. Furthermore, DOPO is advantageous because of good reactivity with an epoxide group thus facilitating the synthesis of a phosphorus-containing epoxy resin. Thorough research into flame retardant epoxy resins including DOPO has been conducted to date. However, limitations are imposed on sufficiently manifesting flame retardancy even when DOPO is contained in the epoxy resin composition, and cured products actually have low phosphorus content below an appropriate level. Thus, even in the case where the phosphorus-containing epoxy resin is used as a main material, a flame retardant system further including an additive type flame retardant is typically adopted.

DISCLOSURE

Technical Problem

Accordingly, the present invention is intended to provide a novel phosphorus-containing phenol novolac resin.

Also, the present invention is intended to provide the use of the phosphorus-containing phenol novolac resin as an epoxy hardener so as to satisfy both flame retardancy and heat resistance upon formation of a cured product.

Also, the present invention is intended to provide an epoxy resin composition which includes a hardener including the phosphorus-containing phenol novolac resin thus increasing phosphorus content so as to satisfy both flame retardancy and heat resistance.

In particular, in the case where a phosphorus-containing epoxy resin is used as an epoxy resin, the phosphorus content of the composition may be increased, thus easily achieving the desired flame retardancy.

Also, the present invention is intended to provide an epoxy cured product which has high phosphorus content and satisfies heat resistance.

Technical Solution

An aspect of the present invention provides a phosphorus-containing phenol novolac resin having a repeating unit represented by Formula 1 below and a weight average molecular weight ranging from 400 to 4,000.

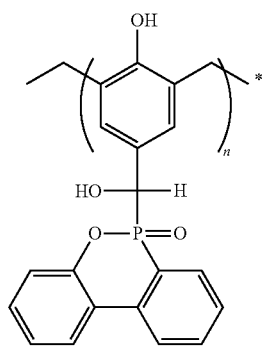

Formula 1

In this aspect, the phosphorus-containing phenol novolac resin may have a softening point of 50~200° C.

In this aspect, the phosphorus-containing phenol novolac resin may have a phosphorus content of 1 wt % or more.

In this aspect, the phosphorus-containing phenol novolac resin may be soluble in 2-methoxyethanol, 1-methoxy-2-propanol and dimethylformamide, and the solvents in which the resin is soluble are not limited to the above solvents.

Another aspect of the present invention provides an epoxy hardener, including the above phosphorus-containing phenol novolac resin.

A further aspect of the present invention provides an epoxy resin composition, including an epoxy resin and a hardener including the phosphorus-containing phenol novolac resin represented by Formula 1 below.

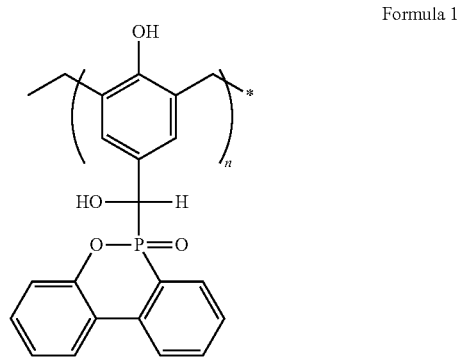

Formula 1

In the epoxy resin composition according to this aspect, the phosphorus-containing phenol novolac resin may have a softening point of 50~200° C.

In the epoxy resin composition according to this aspect, the phosphorus-containing phenol novolac resin may have a phosphorus content of 1 wt % or more.

In the epoxy resin composition according to this aspect, the hardener may be a mixture of phosphorus-containing phenol novolac resin and phosphorus-free phenol novolac resin, and may contain 20 wt % or more of the phosphorus-containing phenol novolac resin based on the total amount of the hardener. Also, the phosphorus-containing phenol novolac resin may be soluble in 2-methoxyethanol, 1-methoxy-2-propanol and dimethylformamide, and the solvents in which the resin is soluble are not limited to the above solvents.

In the epoxy resin composition according to this aspect, the epoxy resin may be a phosphorus-containing epoxy resin.

Still a further aspect of the present invention provides a cured product of the above epoxy resin composition, the cured product having a phosphorus content of 1 wt % or more, particularly 3 wt % or more. The cured product may have a glass transition temperature of 120° C. or higher.

The phosphorus-containing phenol novolac resin according to the present invention may be used as the hardener thus easily increasing the phosphorus content of the cured product, and also may have an appropriate molecular weight thus preventing heat resistance from decreasing. Hence, when the phosphorus-containing phenol novolac resin is contained as the hardener in the epoxy resin composition, the resulting cured product may satisfy flame retardancy and heat resistance.

MODE FOR INVENTION

An embodiment of the present invention provides a phosphorus-containing phenol novolac resin adapted for an epoxy resin hardener, having a repeating unit represented by Formula 1 below and a weight average molecular weight ranging from 400 to 4,000.

Formula 1

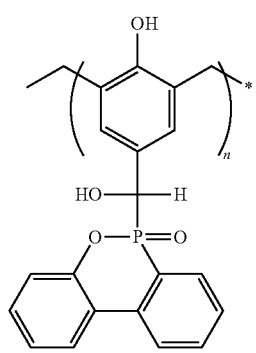

The preparation of the phosphorus-containing phenol novolac resin (hereinafter abbreviated to "DOPO-PN") is not particularly limited, and may include reacting 4-hydroxybenzaldehyde with DOPO, thus producing DOPO-HB (Reaction 1), which is then reacted with an aldehyde, yielding DOPO-PN (Reaction 2).

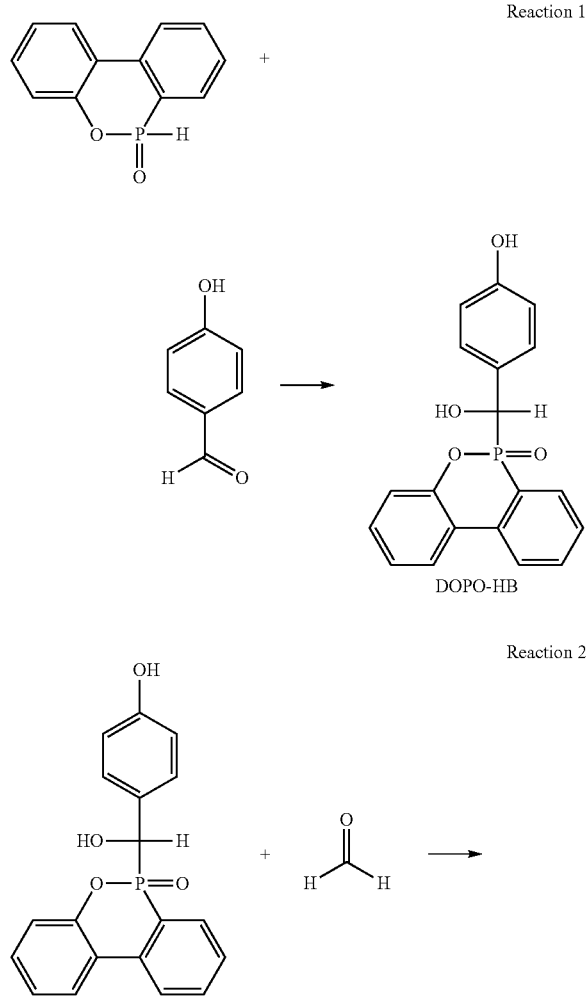

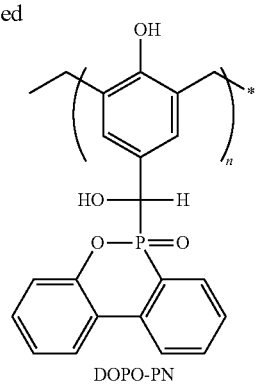

DOPO-PN

The nucleophilic addition reaction between the —P(O)—H group which is a nucelophile and the C=O group which is an electrophile present in aldehydes or ketones is well known. Using this reaction, DOPO is reacted with 4-hydroxybenzaldehyde, thus synthesizing DOPO-HB having both the —OH group and the phosphorus component (Reaction 1).

As such, the reaction equivalent ratio of DOPO and 4-hydroxybenzaldehyde may be set to 1:0.8~1.2.

Examples of the solvent useful in the above reaction may include toluene, tetrahydrofuran, xylene, 2-methoxyethanol, and 1-methoxy-2-propanol, and the reaction may be carried out using a reflux process for 3~12 hours.

Then, DOPO-HB thus obtained and formaldehyde are reacted together, thus obtaining the novel DOPO-PN according to the embodiment of the present invention.

In the reaction, the molecular weight of DOPO-PN may be controlled depending on the reaction ratio of DOPO-HB and aldehyde. The reaction equivalent ratio of DOPO-HB and formaldehyde may be set to 1:0.4~0.95, and preferably 1:0.5~0.9.

In particular, because the properties of a cured product may vary with the molecular weight of DOPO-PN when DOPO-PN is used as an epoxy hardener, it is the most preferable that the reaction equivalent ratio of DOPO-HB and formaldehyde be 1:0.6~0.85.

Upon this reaction, the most appropriate reaction solvent may be DMF, and the acid catalyst may be of various different kinds, particularly favored being diethyl sulfate.

The DOPO-PN according to the embodiment of the present invention preferably has a weight average molecular weight ranging from 400 to 4,000. If the molecular weight thereof is too low, the glass transition temperature may be decreased. In contrast, if the molecular weigh thereof is too high, it is difficult to control the degree of curing and impregnability may be problematic.

The resulting DOPO-PN may have a softening point of 50~200° C.

Also, the DOPO-PN may have a phosphorus content of 1 wt % or more, preferably 5 wt % or more and more preferably 8 wt % or more, because preventing heat resistance from decreasing while exhibiting flame retardancy when used as a hardener must be taken into consideration.

The DOPO-PN according to the embodiment of the present invention is soluble in various organic solvents such as 2-methoxyethanol, 1-methoxy-2-propanol, and DMF, and also is partially soluble in methylethylketone.

These solvents are essential when DOPO-PN is used as a hardener for a copper clad laminate, and the DOPO-PN according to the embodiment of the present invention may be very usefully applied to material for electronic products.

In particular, the DOPO-PN thus obtained may be utilized as an epoxy hardener. Upon use as an epoxy hardener, the DOPO-PN may be used alone or in combination with another epoxy hardener. An example of another epoxy hardener may include a novolac type hardener, exemplified by phenol novolac or cresol novolac. Preferably, the DOPO-PN may be used in combination with a typical phosphorus-free novolac type hardener in terms of satisfying both flame retardancy and heat resistance. When used in combination with another hardener, the DOPO-PN may be used in an amount of 20 wt % or more based on the total amount of the hardener in terms of flame retardancy and heat resistance.

In addition, another embodiment of the present invention provides an epoxy resin composition including an epoxy resin and a hardener including the DOPO-PN.

In the case where the hardener including the DOPO-PN is contained in the epoxy resin composition, the phosphorus content of the cured product may be increased compared to when a phosphorus-containing epoxy resin is used as the main material, and flame retardancy may become superior compared to other additive type flame retardants.

In particular, the DOPO-PN may be mixed with a typical phosphorus-free novolac type epoxy hardener in terms of imparting flame retardancy and preventing heat resistance from decreasing. As such, the mixing ratio may be adjusted within a range that appropriately satisfies flame retardancy and heat resistance.

In particular, the DOPO-PN may be used in an amount of 20 wt % or more and preferably 25~75 wt % based on the total amount of the hardener. If the DOPO-PN is excessively contained in the hardener, flame retardancy is improved but heat resistance may be decreased. In contrast, if the DOPO-PN is contained in an amount less than a predetermined level, it is difficult to achieve one of the purposes which is to impart flame retardancy.

In particular, in order to further increase the phosphorus content of the epoxy resin composition, the epoxy resin may include a phosphorus-containing epoxy resin.

The cured product obtained from such an epoxy resin composition may have a phosphorus content of at least 1.0 wt % and preferably 3 wt %. In the case where the epoxy resin includes the phosphorus-containing epoxy resin, the phosphorus content may be increased up to at least 5 wt %.

Thereby, the cured product having improved flame retardancy may be obtained.

The cured product including the DOPO-PN according to the present invention as the hardener may have a glass transition temperature of 120° C. or higher, thus exhibiting superior heat resistance.

A better understanding of the present invention may be obtained through the following examples which are set forth to illustrate, but are not to be construed as limiting the present invention.

In the following examples, the molecular weight was determined using Waters GPC 2414 Refractive index detector. Specifically, the GPC conditions were as follows; Column—Waters Styragel HR 0.5, HR 1, HR 2, HR 3
  Oven—35° C. Isotherm
  Carrier—THF
  Injection—100 µl, 35° C.
  Detection—RI Detector
  Flow—1 ml/min $^1$H NMR spectrum was obtained using TMS or DMSO-$d_6$ as an internal standard material by means of Varian Germini 300 (300, 75 MHz). A DSC thermogram was determined at a heating rate of 20° C./min in the range of 30~300° C. using TA Instruments DSC 2910, and thermogravimetric analysis was measured at a heating rate of 10° C./min using TA TGA Q-500 Series.

UL-94 flame retardancy was measured according to Underwriter Laboratory standard. To this end, five test samples each having a length of 127 mm, a width of 12.7 mm and a thickness of 0.5 mm were used, and a burning test was performed using a Bunsen burner.

EXAMPLE 1

(1) Synthesis of DOPO-HB

A nucleophilic addition reaction between the —P(O)—H group which is a nucleophile and the C=O group which is an electrophile present in aldehydes or ketones is well known. Using this reaction, DOPO and 4-hydroxybenzaldehyde were reacted together, thus synthesizing DOPO-HB having both —OH group and a phosphorus component (Reaction 1).

Specifically, DOPO (216 g, 1 mol, available from Schill & Seilacher) and 4-hydroxybenzaldehyde (134 g, 1.1 mol, available from Aldrich) were added to toluene (1,000 ml) and well dissolved therein.

This reaction mixture was heated to reflux at 120° C. for 5 hours, cooled to room temperature, washed with toluene, and then recrystallized in methanol, thus obtaining a product.

Yield: 95%
Melting point: 241° C.
$^1$H NMR (300 MHz, DMSO-$d_6$) δ 5.01 (1H, dd, J=5.7, 6.0 Hz), 5.18 (1H, t, J=11.3 Hz), 6.14-6.30 (1H, m), 6.66-8.20 (12H, m), 9.45 (1H, d, J=14.5 Hz)

(2) Synthesis of DOPO-PN

DOPO-PN was synthesized from DOPO-HB and formaldehyde.

Specifically, DOPO-HB (101.56 g, 0.3 mol) and 89% formaldehyde (7.09 g, 0.21 mol, 89% formalin for industrial use) were added to DMF (500 ml) and well mixed together. This mixture was added with diethyl sulfate (0.51 g, 0.0033 mol), after which the mixture was heated to reflux at 125° C. for 8 hours. After completion of the reaction, the reaction product was deaerated to 175° C. under pressure reduced to a vacuum level of 720 mmHg, thus removing the solvent.

The product thus obtained had a softening point of 81° C., and a phosphorus content of 8.8%. The product dissolved well in 2-methoxymethanol and 1-methoxy-2-propanol.

Yield: 90%
Softening point: 81° C.
Weight average molecular weight: 923
$^1$H NMR (300 MHz, DMSO-$d_6$) δ 3.50 (2H, dd, J=3.0, 4.4 Hz), 4.32 (1H, t, J=40.9 Hz), 6.56-8.28 (10H, m), 9.79 (1H, s)

EXAMPLE 2

DOPO-PN was synthesized in the same manner as in Example 1, with the exception that DOPO-HB (101.56 g, 0.3 mol) and formaldehyde (8.10 g, 0.24 mol) were used in (2).

The product thus obtained had a softening point of 94° C., a phosphorus content of 8.8%, and a weight average molecular weight of 1,024.

EXAMPLE 3

DOPO-PN was synthesized in the same manner as in Example 1, with the exception that DOPO-HB (101.56 g, 0.3 mol) and formaldehyde (8.60 g, 0.255 mol) were used.

The product thus obtained had a softening point of 108° C., a phosphorus content of 8.71, and a weight average molecular weight of 1,870.

Test Example

Evaluation of Solubility in Solvent

The DOPO-PN of Example 1 was measured for solubility in various solvents. The results are shown in Table 1 below.

The solubility in various solvents was measured by mixing the resin and the solvent at a weight ratio of 50:50, dissolving this mixture at 50° C. for 2 hours, transferring the completely dissolved solution into a 100 ml vial, storing it at room temperature (25° C.) for 24 hours, and after 24 hours, observing with the naked eye whether a white residue, a precipitate, or an insoluble portion remained in solution.

TABLE 1

|  | Solvent | Solubility |
|---|---|---|
| Ex. 1 | 2-Methoxyethanol | Good |
|  | 1-Methoxy-2-Propanol | Good |
|  | Methylethylketone | Poor |
|  | DMF | Good |

EXAMPLE 4

Using the DOPO-PN of Example 1 as a hardener, an epoxy resin composition was synthesized.

Specifically, a main material, for example, a phenol novolac epoxy resin (PNE KEP-1138, available from Kolon: epoxy equivalent weight=180) was subjected to a curing reaction with a hardener, thus obtaining a cured product. The hardener was a mixture of DOPO-PN and a phosphorus-free phenol novolac (PN) resin (hydroxyl equivalent weight=106, Mn=1200 (n=11~12), softening point=120° C., available from Kolon), and the equivalent ratio of epoxy resin and hardener was 1:1. The mixing ratio of the hardener is shown in Table 2 below.

Used as a curing accelerator was triphenylphosphine.

TABLE 2

| Entry | DOPO-PN/PN | Phosphorus Content (wt %) |
|---|---|---|
| F1 | 0/100 | 0 |
| F2 | 25/75 | 2.2 |
| F3 | 50/50 | 3.8 |
| F4 | 75/25 | 5.0 |
| F5 | 100/0 | 5.9 |

The epoxy resin was well blended with the hardener including the DOPO-PN/PN mixture, after which triphenylphosphine was added in an amount of 0.5 parts by weight based on epoxy and mixed well. The resulting mixture was poured into a mold, cured in an oven at 180° C. for 1 hour, and cooled to room temperature, thus producing a cured product.

The equivalent ratio of epoxy resin and hardener was 1:1.

The curing properties of the cured product were analyzed as follows.

(1) Measurement of Glass Transition Temperature

The glass transition temperature (Tg) of the cured product was measured through DSC analysis. The results are shown in Table 3 below.

TABLE 3

| Entry | DOPO-PN/PN | Tg (° C.) |
|---|---|---|
| F1 | 0/100 | 155.83 |
| F2 | 25/75 | 151.95 |
| F3 | 50/50 | 138.40 |
| F4 | 75/25 | 119.57 |
| F5 | 100/0 | 113.29 |

As is apparent from the results of Table 2, in F1 in which only the PN was used as the hardener without the addition of DOPO-PN, the glass transition temperature was the highest. In F5 in which only the DOPO-PN was used, the glass transition temperature was the lowest.

(2) Measurement of Decomposition Temperature

The decomposition temperature (Td) of the same mixture was measured using TGA. The results are shown in Table 4 below.

TABLE 4

| Entry | DOPO-PN/PN | Td (° C.) |
|---|---|---|
| F1 | 0/100 | 357.25 |
| F2 | 25/75 | 349.25 |
| F3 | 50/50 | 338.10 |
| F4 | 75/25 | 329.06 |
| F5 | 100/0 | 328.11 |

Compared to the glass transition temperature, the decomposition temperature had a relatively lower deviation but exhibited a similar tendency. In F1 in which the amount of PN was the greatest, the decomposition temperature was the highest. In F5, the lowest numerical value was obtained.

(3) Evaluation of UL-94 Flame Retardancy

The flame retardancy rating depending on the phosphorus content of the cured product was evaluated. The results are shown in Table 5 below.

TABLE 5

| Entry | DOPO-PN/PN | Phosphorus Content (wt %) | Burning Time (sec) | UL-94 Class |
|---|---|---|---|---|
| F1 | 0/100 | 0 | 42 | V-1 |
| F2 | 25/75 | 2.2 | 13 | V-1 |
| F3 | 50/50 | 3.8 | 2 | V-0 |
| F4 | 75/25 | 5.0 | 1 | V-0 |
| F5 | 100/0 | 5.9 | 0 | V-0 |

As is apparent from test results, F1 and F2 did not satisfy the V-0 rating while the test sample was burned, and F3, F4 and F5 satisfied V-0 rating. In particular, in F5, the test sample was not burned at all. It can seen that flame retardancy was increased proportionally to the increase in phosphorus content.

The results of measuring the curing properties of the cured product resulting from the curing reaction between the phenol novolac epoxy and the hardener including DOPO-PN showed that the use of the hardener including DOPO-PN and PN mixed at 1:1 was optimal in terms of satisfying flame retardancy corresponding to UL-94 V-0 rating without the glass transition temperature being greatly decreased.

EXAMPLE 5

An epoxy resin composition and a cured product were produced in the same manner as in Example 4, with the exception that the DOPO-PN of Example 2 was used and the hardener was provided in the same form as F4 of Example 4.

The phosphorus content, glass transition temperature, decomposition temperature, and UL-94 flame retardancy of the cured product were measured as in Example 4. The results are shown in Table 6 below.

EXAMPLE 6

An epoxy resin composition and a cured product were prepared in the same manner as in Example 4, with the exception that the DOPO-PN of Example 3 was used and the hardener was provided in the same form as F4 of Example 4.

The phosphorus content, glass transition temperature, decomposition temperature, and UL-94 flame retardancy of the cured product were measured as in Example 4. The results are shown in Table 6 below.

TABLE 6

|  | Ex. 5 | Ex. 6 |
| --- | --- | --- |
| Phosphorus Content (wt %) | 4.98 | 5.0 |
| Tg (° C.) | 122.54 | 124.25 |
| Td (° C.) | 330.38 | 331.41 |
| UL-94 Class | V-0 | V-0 |

EXAMPLE 7

An epoxy hardener composition was prepared to have the same constitution as Example 5, and a cured product was obtained in the same manner as in Example 5, with the exception that a phosphorus-containing epoxy resin (phosphorus content=2.9%, epoxy equivalent weight=290, available from Kolon) was used as the main material instead of the phenol novolac epoxy resin.

The phosphorus content, glass transition temperature, decomposition temperature, and UL-94 flame retardancy of the cured product were measured as in Example 4. The results are shown in Table 7 below. As such, the mixing ratio of phenol novolac resin and DOPO-PN was 8:2, and the phosphorus content of the cured product was adjusted to the level equal to F3 of Example 4.

TABLE 7

|  | Ex. 7 |
| --- | --- |
| Phosphorus Content (wt %) | 3.86 |
| Tg (° C.) | 144.2 |
| Td (° C) | 339.20 |
| UL-94 Class | V-0 |

The invention claimed is:

1. A phosphorus-containing phenol novolac resin, having a repeating unit represented by Formula 1 below and a weight average molecular weight ranging from 400 to 4,000

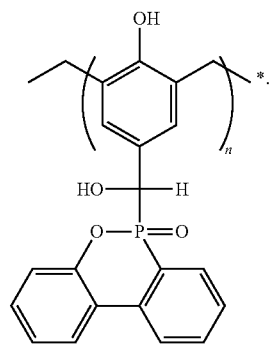

Formula 1

2. The phosphorus-containing phenol novolac resin according to claim 1, having a softening point of 50~200° C.

3. The phosphorus-containing phenol novolac resin according to claim 1, having a phosphorus content of 1 wt % or more.

4. The phosphorus-containing phenol novolac resin according to claim 1, being soluble in 2-methoxyethanol, 1-methoxy-2-propanol and dimethylformamide.

5. An epoxy hardener, comprising the phosphorus-containing phenol novolac resin of claim 1.

6. An epoxy resin composition, comprising:
an epoxy resin; and
a hardener comprising a phosphorus-containing phenol novolac resin having a repeating unit represented by Formula 1 below and a weight average molecular weight ranging from 400 to 4,000

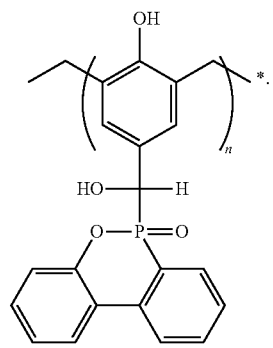

Formula 1

7. The epoxy resin composition according to claim 6, wherein the phosphorus-containing phenol novolac resin has a softening point of 50~200° C.

8. The epoxy resin composition according to claim 6, wherein the phosphorus-containing phenol novolac resin has a phosphorus content of 1 wt % or more.

9. The epoxy resin composition according to claim 6, wherein the phosphorus-containing phenol novolac resin is soluble in 2-methoxyethanol, 1-methoxy-2-propanol and dimethylformamide.

10. The epoxy resin composition according to claim 6, wherein the hardener is a mixture of phosphorus-containing phenol novolac resin and phosphorus-free phenol novolac resin, and contains 20 wt % or more of the phosphorus-containing phenol novolac resin based on a total amount of the hardener.

11. The epoxy resin composition according to claim 6, wherein the epoxy resin is a phosphorus-containing epoxy resin.

12. A cured product of the epoxy resin composition of claim 6.

13. A cured product of the epoxy resin composition of claim 11.

14. The cured product according to claim 12, having a phosphorus content of 1 wt % or more.

15. The cured product according to claim 13, having a phosphorus content of 3 wt % or more.

16. The cured product according to claim 12, having a glass transition temperature of 120° C. or higher.

17. The cured product according to claim 13, having a glass transition temperature of 120° C. or higher.

* * * * *